(12) United States Patent
Chen

(10) Patent No.: US 12,734,608 B2
(45) Date of Patent: Sep. 15, 2026

(54) PROCESSING AND TESTING EQUIPMENT

(71) Applicant: PlayNitride Display Co., Ltd., MiaoLi County (TW)

(72) Inventor: Yen-Mu Chen, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 379 days.

(21) Appl. No.: 18/396,702

(22) Filed: Dec. 27, 2023

(65) Prior Publication Data

US 2025/0214174 A1 Jul. 3, 2025

(51) Int. Cl.

| | |
|---|---|
| ***B23K 26/082*** | (2014.01) |
| ***B23K 26/03*** | (2006.01) |
| ***B23K 26/70*** | (2014.01) |
| ***B23K 31/12*** | (2006.01) |

(52) U.S. Cl.

CPC .......... *B23K 26/082* (2015.10); *B23K 26/032* (2013.01); *B23K 26/702* (2015.10); *B23K 31/12* (2013.01)

(58) Field of Classification Search

None

See application file for complete search history.

(56) References Cited

U.S. PATENT DOCUMENTS

| | | | | |
|---|---|---|---|---|
| 2010/0314533 | A1* | 12/2010 | Stallinga ............ | G02B 21/0084 250/234 |
| 2020/0393691 | A1 | 12/2020 | Owens et al. | |

FOREIGN PATENT DOCUMENTS

| | | |
|---|---|---|
| CN | 101903820 | 12/2010 |
| CN | 112033959 | 12/2020 |
| CN | 115416302 | 12/2022 |
| TW | 202234127 | 9/2022 |

OTHER PUBLICATIONS

English Translation of CN112033959A (Year: 2020).*

"Office Action of Taiwan Counterpart Application", issued on Nov. 5, 2024, p. 1-p. 6.

* cited by examiner

*Primary Examiner* — Ryan A Jarrett

(74) *Attorney, Agent, or Firm* — JCIPRNET

(57) ABSTRACT

A processing and testing equipment includes a carrier stage, a processing unit and a measuring unit. The carrier stage carries processing components. Processing unit provides a processing laser, and laser performs a manufacturing process on processing component on carrier stage. Measurement unit includes light source, vibration mirror, image sensing element and focusing module. Light source illuminates position of processing component on carrier stage, and processing component generates a light signal. Vibration mirror reflects light signal from processing component. The image sensing element has an image sensing area and receives the light signal reflected by the vibration mirror. The focusing module images light signal onto image sensing element. Light source activation time interval is synchronized with time interval when vibration mirror reflects light signal to image sensing area. Images recorded by image sensing element include images received at different time sequences. A testing equipment is also provided.

7 Claims, 9 Drawing Sheets

| | | | | |
|---|---|---|---|---|
| $Im_1$ | $Im_6$ | $Im_{11}$ | $Im_{16}$ | $Im_{21}$ |
| $Im_2$ | $Im_7$ | $Im_{12}$ | $Im_{17}$ | $Im_{22}$ |
| $Im_3$ | $Im_8$ | $Im_{13}$ | $Im_{18}$ | $Im_{23}$ |
| $Im_4$ | $Im_9$ | $Im_{14}$ | $Im_{19}$ | $Im_{24}$ |
| $Im_5$ | $Im_{10}$ | $Im_{15}$ | $Im_{20}$ | $Im_{25}$ |

FIG. 1D

PROCESSING AND TESTING EQUIPMENT

BACKGROUND

Technical Field

The present invention relates to a processing and testing equipment and a testing equipment.

Description of Related Art

Currently, in the laser processing process, it is impossible to dynamically and simultaneously analyze the processing process or product fabrication process. In other words, the laser processing process for the product on one stage is completed finished, and then the product is transferred to another stage for inspection. As a result, it takes more time to analyze the products after the processing process, which also causes more time loss and affects production efficiency.

SUMMARY

The processing and testing equipment and testing equipment provided by the present invention can adopt temporal-tomography fast image system combined with high repetition frequency and short pulse laser probe beam to achieve high dynamically analyzed images. It can be analyzed by temporal tomography during the processing process or product fabrication process.

In an embodiment of the present invention, a processing and testing equipment includes a carrier stage, a processing unit and a measurement unit. The carrier stage carries processing components, and the processing unit provides a process laser. The processing unit is configured to perform the processing process on the processing components on the carrier stage. The measurement unit includes a light source, a vibration mirror, an image sensing element and a focusing module. The light source illuminates a position of the processing component on the carrier stage. The light source makes the processing component generate a plurality of light signals. The vibration mirror reflects the plurality of light signals from the processing component to different directions according to a plurality of timings. The image sensing element has a plurality of image sensing areas. The image sensing element is respectively configured to receive the plurality of light signals reflected by the vibration mirror according to the plurality of timings. The focusing module is disposed in the light path from the carrier stage to the image sensing element. The focusing module is configured to make the plurality of light signals reflected by the vibration mirror from the different directions be respectively imaged in each of the plurality of the image sensing areas of the image sensing element according to the plurality of timings. The field of view of the focusing module covers the processing component. A plurality of time intervals when the light source are activated are synchronized with each of the plurality of timings when the vibration mirror reflects each of the plurality of light signals to each of the plurality of corresponding image sensing areas, and a recorded picture of the image sensing element in a single exposure comprises a plurality of images received according to the plurality of different timings, and the plurality of images are respectively imaged in the plurality of different image sensing areas.

In an embodiment of the present invention, a testing equipment includes a vibration mirror, an image sensing element and a focusing module. The vibration mirror reflects a plurality of light signals from a sample to different directions according to a plurality of different timings. The image sensing element has a plurality of image sensing areas. The image sensing element is respectively configured to receive the plurality of light signals from the plurality of different timings of the vibration mirror. The focusing module is disposed in a light path between the vibration mirror and the image sensing element or between the vibration mirror and the sample. The focusing module is configured to make the plurality of light signals reflected by the vibration mirror from the different directions according to the plurality of different timings respectively be respectively imaged in each of the plurality of image sensing areas of the image sensing element, and the field of view of the focusing module covers the sample. A recorded picture of the image sensing element in a single exposure comprises a plurality of images received by the plurality of different timings, and the plurality of images are respectively imaged in the plurality of different image sensing areas.

Based on the above, in the processing and testing equipment and testing equipment of the embodiment of the present invention, the carrier stage carries the processing component (sample), and the processing unit provides a process laser to perform the processing process on the processing component on the carrier stage. For the measurement unit, the light source illuminates the processing component (sample) to generate a light signal from the processing component (sample), and the vibration mirror reflects the plurality of light signals from the processing component (sample) to different directions according to a plurality of different timings. The plurality of light signals are imaged in the image sensing element through the focusing model. A plurality of time intervals when the light source are activated are synchronized with each of the plurality of timings when the vibration mirror reflects each of the plurality of light signals to each of the plurality of corresponding image sensing areas, and a recorded picture of the image sensing element in a single exposure comprises a plurality of images received according to the plurality of different timings, and the plurality of images are respectively imaged in the plurality of different image sensing areas. Through post-production, the plurality of images corresponding to each of the plurality of image sensing area in the recorded picture in the single exposure are captured and arranged according to the plurality of timings, and the video of the processing component (sample) during the processing process can be continuously played. In this way, high dynamic resolution images (such as ultra-high dynamic resolution images) can be achieved, and temporal tomography analysis can be performed simultaneously during the processing process or product fabrication process.

BRIEF DESCRIPTION OF THE DRAWINGS

FIGS. 1A to 1D are schematic diagrams of a processing and testing equipment according to an embodiment of the present invention.

DESCRIPTION OF THE EMBODIMENTS

FIGS. 1A to 1D are schematic diagrams of a processing and testing equipment according to an embodiment of the present invention.

Figure 1A:
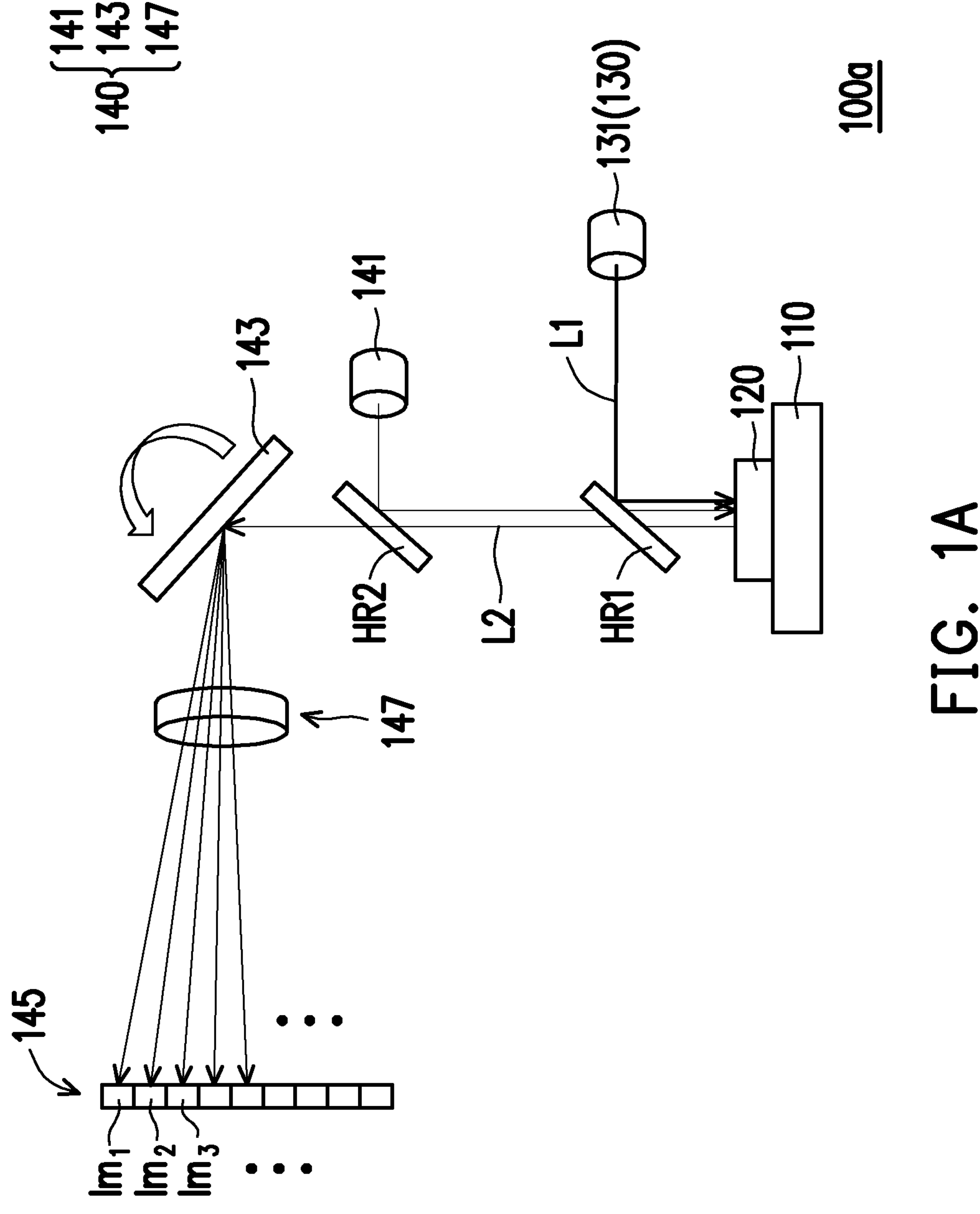

As shown in FIG. 1A, a processing and testing equipment 100*a* includes a carrier stage 110, a processing unit 130 and a measurement unit 140. The carrier stage 110 is configured to carry the processing component 120. The processing unit 130 includes a process laser light source 131, which provides a process laser L1 to perform the processing process on the processing component 120 on the carrier stage 110.

The measurement unit 140 includes a light source 141, a vibration mirror 143, an image sensing element 145 and a focusing module 147. The light source 141 illuminates the position of the processing component 120 on the carrier stage 110, causing the processing component 120 to generate a light signal L2. The light source 141 guides light to the processing component 120 through the semi-reflective mirror HR2, so that the processing component 120 generates a light signal L2. The vibration mirror 143 reflects the light signal L2 from the processing component 120 to different directions according to a plurality of timings. The light signal L2 may be a light signal reflected by the processing component 120, or a light signal from the processing component 120 irradiated.

The image sensing element 145 has a plurality of image sensing areas which receive a plurality of light signals L2 reflected from the vibration mirror 143 according to a plurality of timings. The focusing module 147 is disposed in the light path from the carrier stage 110 to the image sensing element 145. The focusing module 147 is configured to make the plurality of light signals L2 reflected by the vibration mirror 143 from the different directions be respectively imaged in each of the plurality of the image sensing areas of the image sensing element 145 according to the plurality of timings, and the field of view R1 of the focusing module 147 covers the processing component 120.

A plurality of time intervals when the light source 141 are activated are synchronized with each of the plurality of timings when the vibration mirror 143 reflects each of the plurality of light signals L2 to each of the plurality of corresponding image sensing areas, a recorded picture of the image sensing element 145 in a single exposure comprises a plurality of images received according to the plurality of different timings, and the plurality of images are respectively imaged in the plurality of different image sensing areas.

Figure 1B:
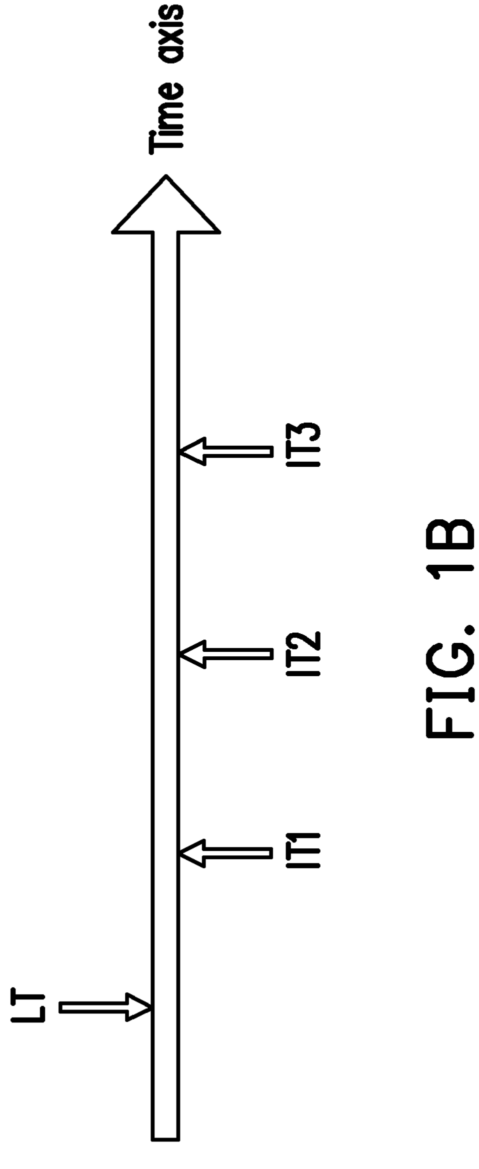
Figure 1C:
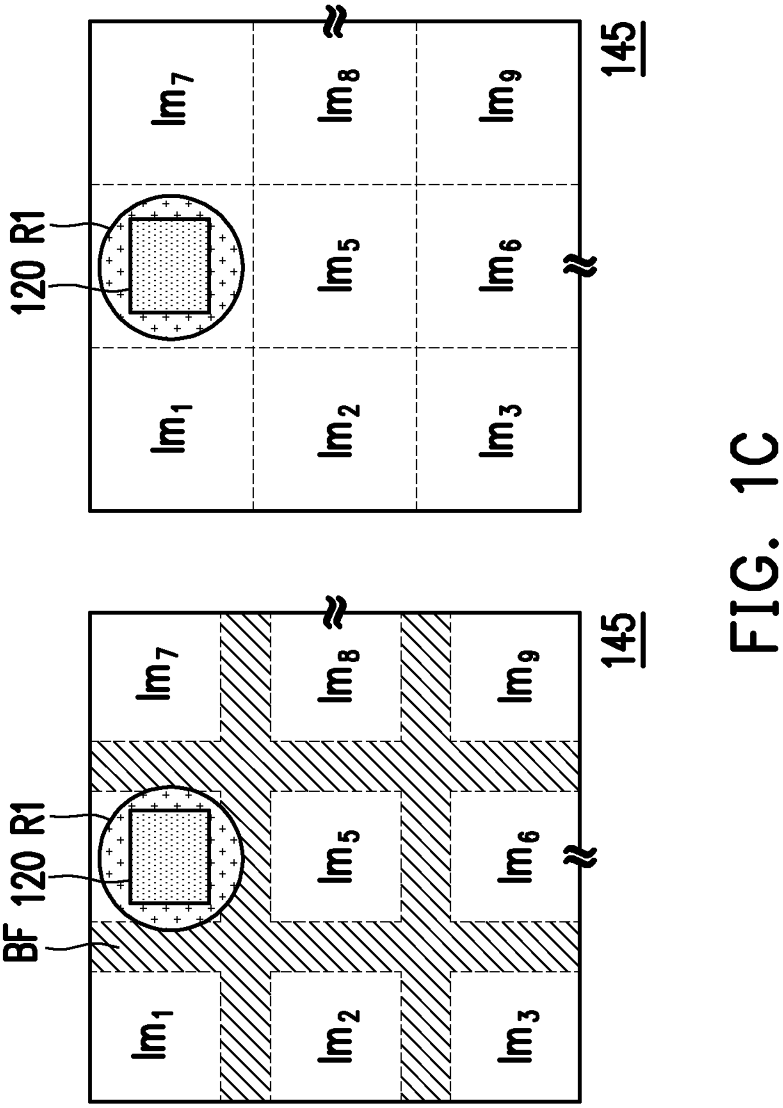

As shown in FIG. 1B, the processing process LT are followed by the plurality of timings (IT1~IT3). As shown in FIG. 1C, a buffer zone BF located between the plurality of image sensing areas ($Im_1$~$Im_9$) is configured to spatially separate the plurality of image sensing areas ($Im_1$~$Im_9$) and prevent images with the plurality of different timings from interfering.

The image corresponding to the field of view R1 is imaged into one of the plurality of image sensing areas and the buffer zone BF surrounding the plurality of image sensing areas. Or the image corresponding to the field of view R1 is completely imaged into one of the plurality of image sensing areas.

The optical images of the processing component 120 changed with time is reflected by the vibration mirror 143 to the image sensing element 145. Images with the plurality of different timings are recorded in the plurality of different sensing areas in the image sensing element 145. The vibration mirror 143 has different angles in the plurality of different timings.

The vibration mirror 145 reflects the image with the first timing IT1 to the first sensing area $Im_1$, and reflects the image with the second timing IT2 to the second sensing area $Im_2$. There is a focusing module 147 located between the processing component 120 and the vibration mirror 143 or between the vibration mirror 143 and the image sensing element 145. The focusing module 147 is configured to make the image of the processing component 120 to be imaged in the image sensing element 145.

When each of the plurality of image sensing areas in the image sensing element 145 is projected by an image, the image sensing element 145 stores all the images of the plurality of image sensing areas and the next round of scanning is repeated. In some embodiments, after part of the sensing area of the image sensing element 145 is projected by an image, the image sensing element 145 stores all the images and the next round of scanning is repeated.

Please refer to FIG. 1D. In this embodiment, in order to observe the continuous state changes of the processing component 120 (or sample) during the processing process, the measurement unit 140 continuously captures a plurality of frames of images (high target number of frames) of the processing component 120.

Since the storage and writing speed (i.e., frames/second) of the image sensing element 145 (which may be a charge-coupled device (CCD) or a complementary metal oxide semiconductor (CMOS)) is limited (less than the target number of frames), images with different time intervals at the same position of the processing component 120 are reflected by the vibration mirror 143 and then pass through the focusing module 147. Finally, the images are sequentially projected on different areas ($Im_1$~ $Im_{25}$) of the image sensing element 147. Herein, twenty-five areas are shown in FIG. 1D, but it is not limited.

The image sensing element 145 continues to receive the light signal L2. After the plurality of frames of images are recorded, the plurality of frames of images are stored and written at once. Subsequently, a plurality of frames of images in an entire picture are divided and arranged according to the plurality of timings to form a video showing the state changes of the processing component 120.

The number of frames per second recorded is the number of sensing areas multiplied by the frame rate of the image sensing element 145. An increase of speed is proportional to the number of sensing areas.

For example, resolution of the image sensing element 145 is 2000 pixel*2000 pixel, which is divided into a plurality of sensing areas. The resolution for each of the plurality of sensing areas is 40 pixel*40 pixel, which can be divided into 5*5=25 sensing areas ($Im_1$~$Im_{25}$ as shown in FIG. 1D). That is, the entire image of the image sensing element 145 can be configured to record the image of the processing component 120 in twenty-five time intervals.

Even if the frame rate of the image sensor element is only thirty fps (there are 30 frames in a video per second), the images of different time intervals can be projected on different positions of the image sensing element 145, and 25*30=750 images can be taken within a unit time (i.e. 1 second), and the 25*30=750 images can be processed into a video after post-production. The number of sensing areas depends on an arrangement manner where the image sensing elements 145 can be placed without overlapping each other.

In addition, if the resolution is 50 pixel*50 pixel, it can be divided into 4×4=16 sensing areas. If the resolution is 60 pixel*60 pixel, it can be divided into 3×3=9 sensing areas. The sensing areas are not necessary to be divided with no remainder, and a buffer zone is reserved between the sensing areas to avoid the influence of tolerance.

Figure 2:
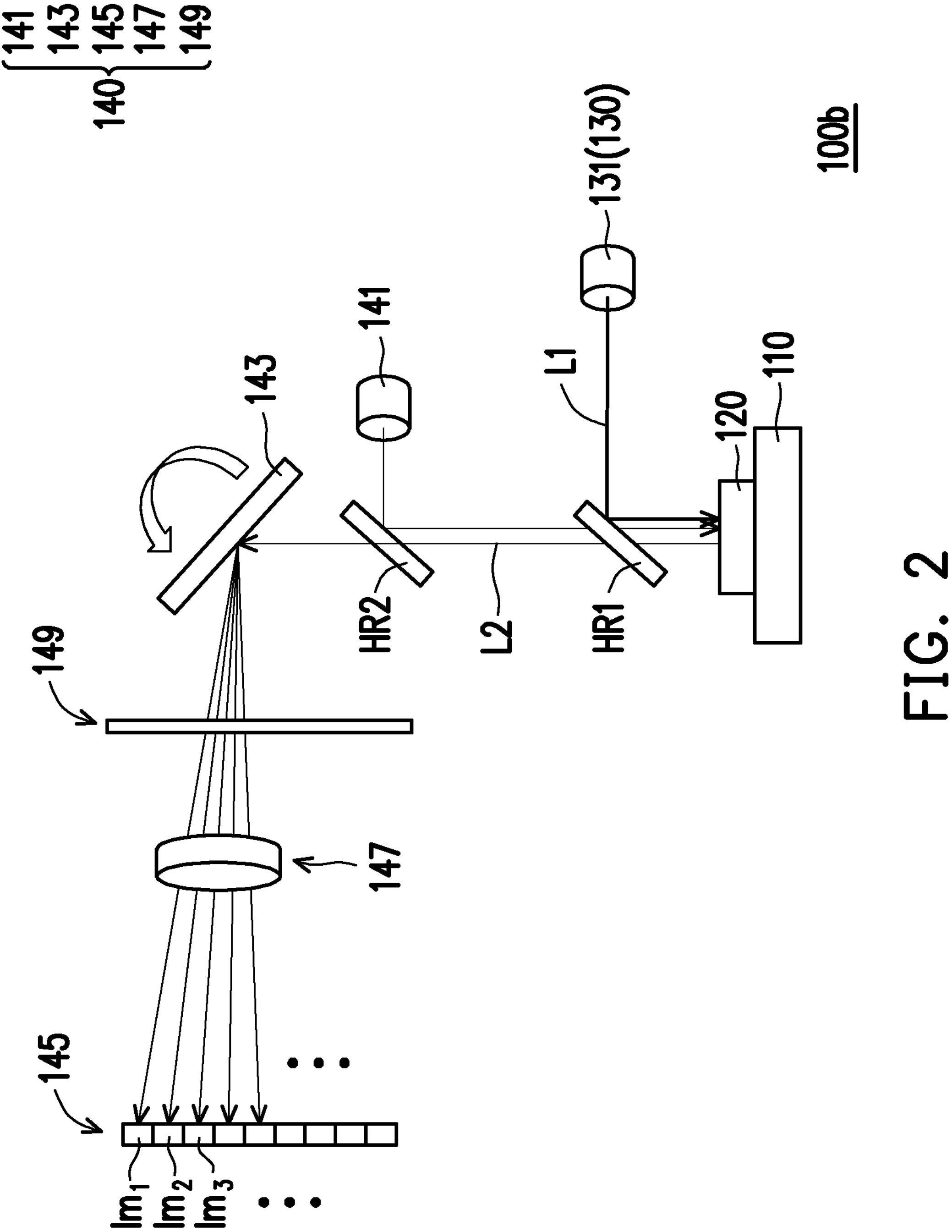
FIG. 2 is a schematic diagram of a processing and testing equipment according to an embodiment of the present invention.

FIG. 2 is a schematic diagram of a processing and testing equipment according to an embodiment of the present invention.

The difference between FIG. 2 and FIG. 1A is that the image sensing element 145 of the measurement unit 140 in the processing and testing equipment 100*b* is continuous in the exposure (recording) state. There is a light modulator 149 (used as a shutter) between the vibration mirror 143 and the image sensing element 145 during a period when the vibration mirror 143 is scanning because the first sensing area $Im_1$ is switched to the second sensing area $Im_2$, resulting in formation of image dragging or afterimage.

When the vibration mirror 143 may make an image of the processing component 120 in specific timing be completely imaged in a specific sensing area and the image has no overflowing or misaligning into other sensing areas, the light modulator 149 will be turned on to allow the light to pass through. After the light modulator 149 is turned off, the vibration mirror 143 is starting to change the angle (that is, changing to an angle that can make an image of another timing to be imaged in another sensing area). The light modulator 149 and the vibration mirror 143 are controlled synchronously.

In addition, the image sensing element 145 is continuous in the exposure (recording) state. During a period when the vibration mirror 143 is scanning, the first sensing area $Im_1$ is switched to the second sensing area $Im_2$, resulting in formation of image dragging or afterimage. The processing component 120 must be illuminated by the light source 141 because the processing component 120 does not emit light.

The light source 141 and the vibration mirror 143 are controlled synchronously. That is, the frequency of the light source 141 turned on or turned off is the same as the frequency of the angle changed by the vibration mirror 143. In some embodiments, light source 141 is a high-frequency pulse laser.

The light source 141 is activated only when the vibration mirror 143 can make the image of the processing component 120 in a specific timing to be imaged in a specific sensing area and the image has no overflowing or misaligning into other sensing areas. After the light source 141 is turned off, the vibration mirror 143 is starting to change the angle (to an angle that can make the image of another timing to be imaged in another sensing area). The half-reflecting mirror HR2 is configured to guide the light source 141 to the processing component 120 and make the image of the light signal L2 penetrate the half-reflecting mirror HR2 to the vibration mirror.

Figure 3A:
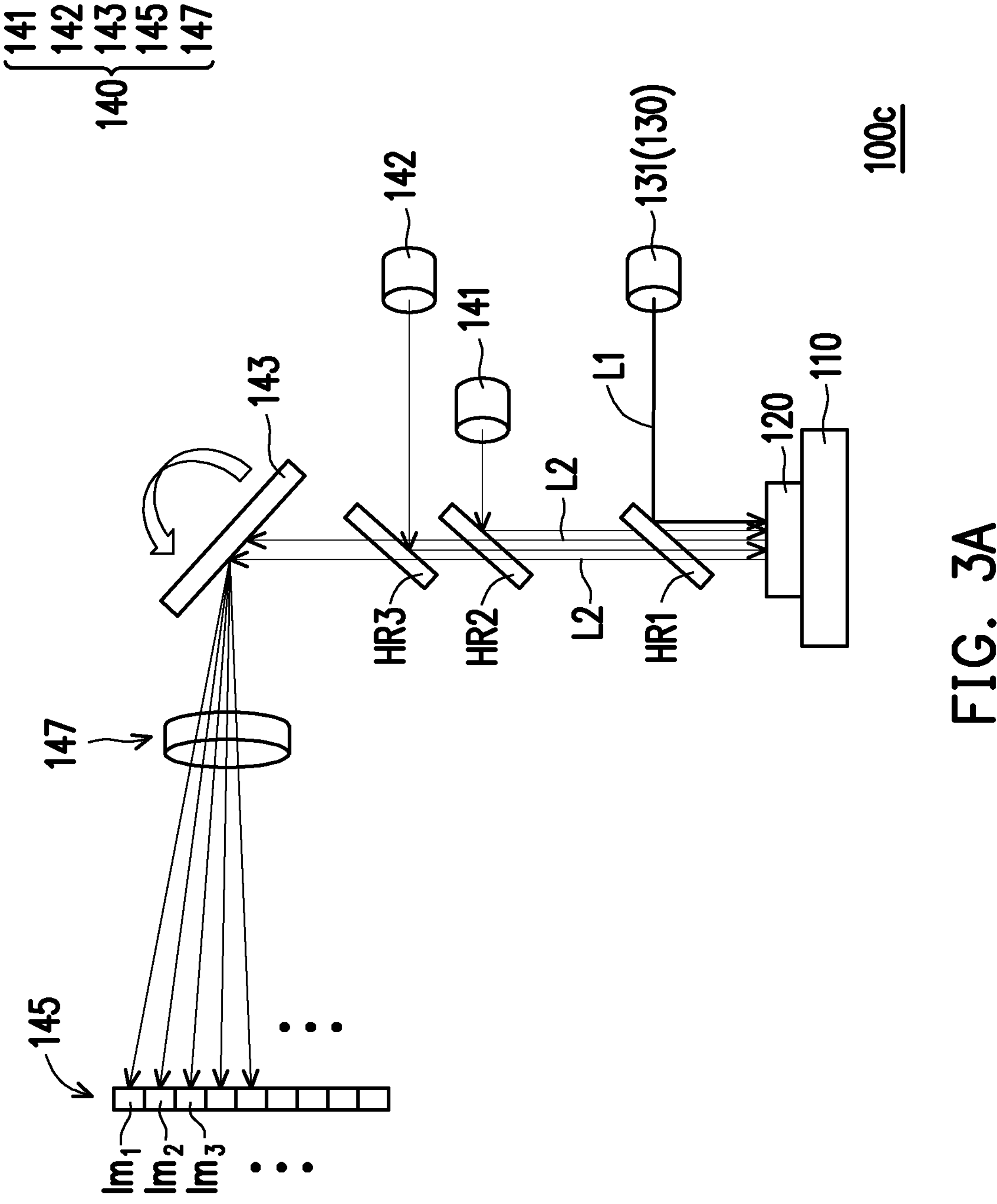
FIGS. 3A to 3B are schematic diagrams of a processing and testing equipment according to an embodiment of the present invention.
Figure 3B:
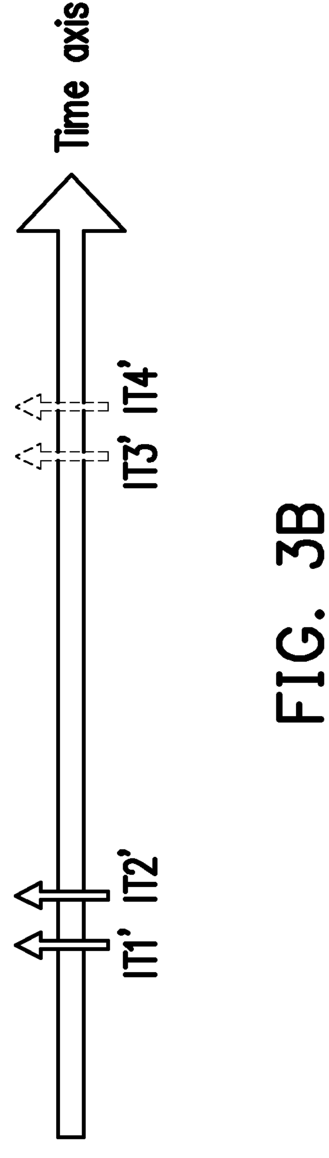

FIGS. 3A to 3B are schematic diagrams of a processing and testing equipment according to an embodiment of the present invention.

The difference between FIG. 3A and FIG. 1A is that the measurement unit 140 in the processing and testing equipment 100*c* includes light sources 141 and light sources 142 of different wavelengths. Light emitted by light sources 141 and light emitted by light sources 142 are guided to the processing component 120 by half-reflecting mirrors HR2 and half-reflecting mirrors HR3 respectively. The wavelength of the light source 141 is, for example, 1064 nm and the wavelength of the light source 142 is, for example, 532 nm.

A timing group is composed of a plurality of timings corresponding to illumination of light sources with different wavelengths. A timing group contains a plurality of timings respectively corresponding to the light emitted by the light sources with the different wavelengths. The minimum time difference between two of the adjacent timing groups is greater than minimum time difference between the plurality of timings in a same timing group.

As shown in FIG. 3B, the processing component 120 is illuminated with the light source 141 in the first timing IT1', and the image reflected is imaged in the first sensing area $Im_1$. The processing component 120 is illuminated with the light source 142 in the second timing IT2', and the image reflected is imaged to second sensing area $Im_2$. First timing IT1' and second timing IT2' belong to the same timing group, which is called the first timing group. A plurality of image sensing areas in the image sensing element 145 respectively record monochromatic images corresponding to the wavelength of the light source 141.

In the third timing IT3', the processing component 120 is illuminated with the light source 142, and the image reflected is imaged in the third sensing area $Im_3$. In the fourth timing IT4', the processing component 120 is illuminated with the light source 142, and the image reflected is imaged in the fourth sensing area $Im_4$. Third timing IT3' and fourth timing IT4' belong to the same timing group, which is called second timing group. A plurality of image sensing areas in the image sensing element 145 respectively record monochromatic images corresponding to the wavelength of the light source 142.

The above-mentioned light sources all illuminate the same position on the processing component 120, thereby producing images of different colors. The light sources include more than two different wavelengths, such as a red laser with a wavelength of 650 nm, a green laser with a wavelength of 532 nm, and a blue laser with a wavelength of 405 nm.

In some embodiments, in the same timing group, the processing component 120 is illuminated with red laser, green laser, and blue laser in three timings respectively. The light emitted by the plurality of light sources with the different wavelengths is alternately guided to the processing component according to the plurality of continuous timings.

The time difference between the second timing IT2' of the first timing group and the third timing IT3' of the second timing group is greater than the time difference between the first timing IT1' of the first timing group and the second timing IT2' of the first timing group. The time difference between the second timing IT2' of the first timing group and the third timing IT3' of the second timing group is greater than the time difference between the third timing IT3' and fourth timing IT4'.

The time difference between the first timing IT1' of the first timing group and the second timing IT2' of the first timing group is equal to the time difference between the third timing IT3' of the second timing group and the fourth timing IT4' of the second timing group.

The time difference between the second timing IT2' of the first timing group and the third timing IT3' of the second timing group is greater than the time difference between the first timing IT1' of the first timing group and second timing IT2' of the first timing group. In some embodiments, the minimum time difference between two of the adjacent timing groups is greater than 6 times, allowing timing groups to be distinguished sufficiently.

A plurality of monochrome images recorded in the plurality of image sensing areas can be superposed to display color images. The larger the time difference between the timing groups is, the state of the processing components changing over time can be shown. The superimposition of a plurality of monochromatic images allows the images to be displayed continuously, showing a color "movie" of the changing states of the processing component 120.

In some embodiments, through post-production, the recorded exposure pictures are captured, and monochrome images of different colors in the same timing group are superimposed to form a color image, and then the color images of each timing group are played continuously. A video of the processing component 120 (sample) during the processing process is available.

Figure 4:
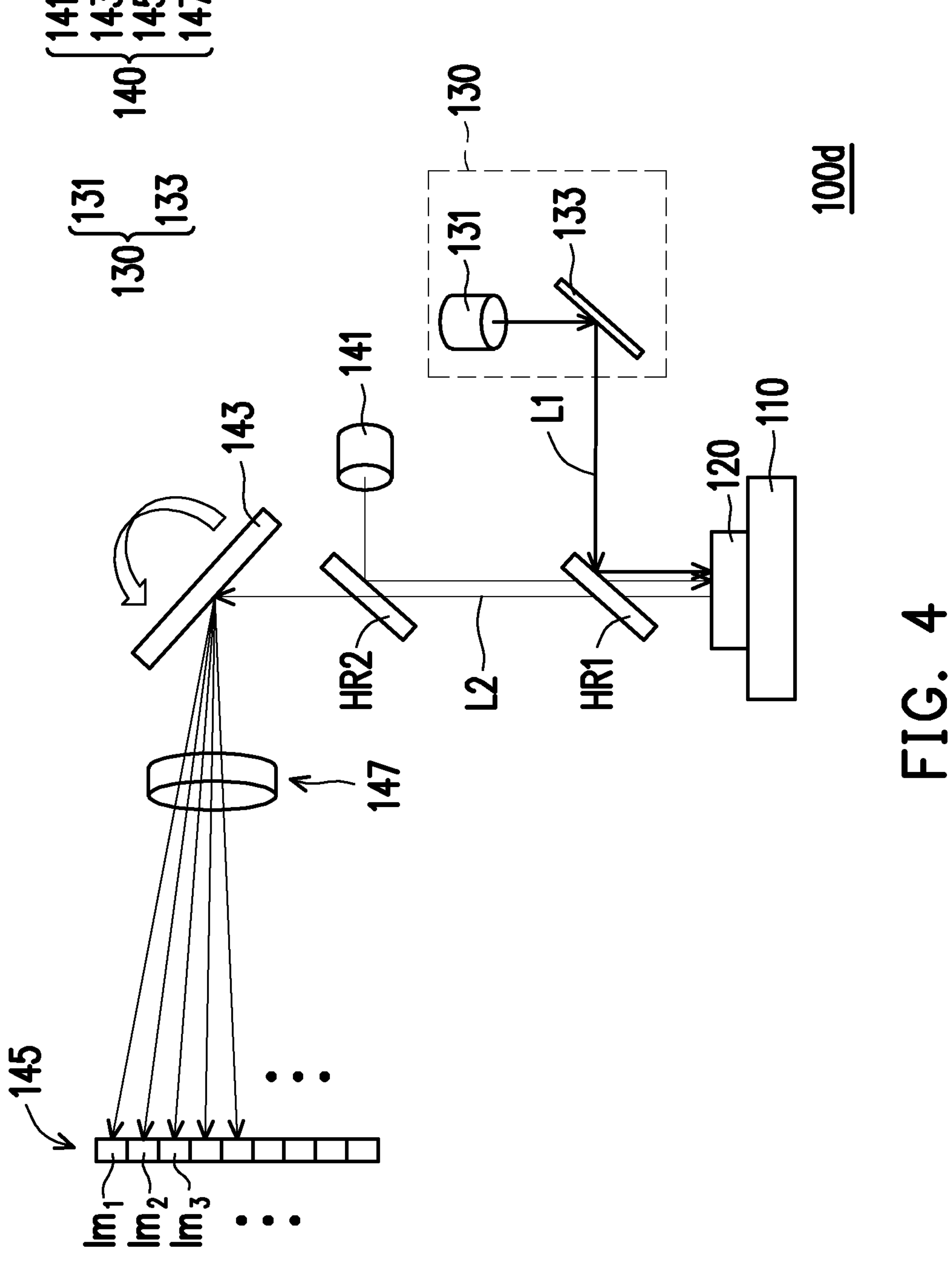
FIG. 4 is a schematic diagram of a processing and testing equipment according to an embodiment of the present invention.

FIG. 4 is a schematic diagram of a processing and testing equipment according to an embodiment of the present invention.

The difference between FIG. 4 and FIG. 1A is that the processing and testing equipment 100*d* includes a processing unit 130 and a measurement unit 140. The processing unit 130 includes a process laser light source 131 and a vibration mirror 133. The process laser light source 131 is configured to provide the process laser L1, and through the changing angle of the vibration mirror 133 and the reflection of the beam splitter HR1, the process laser L1 is illuminated on the specified location of the processing component 120. The process laser L1 is configured to remove the processing component 120 or the process laser L1 is configured to anneal the processing component 120. The position measured by the measurement unit 140 covers the position illuminated by the process laser L1, and is measured simultaneously during processing. In some embodiments, the processing component 120 is a micro light-emitting diode.

Figures 5A, 5B:
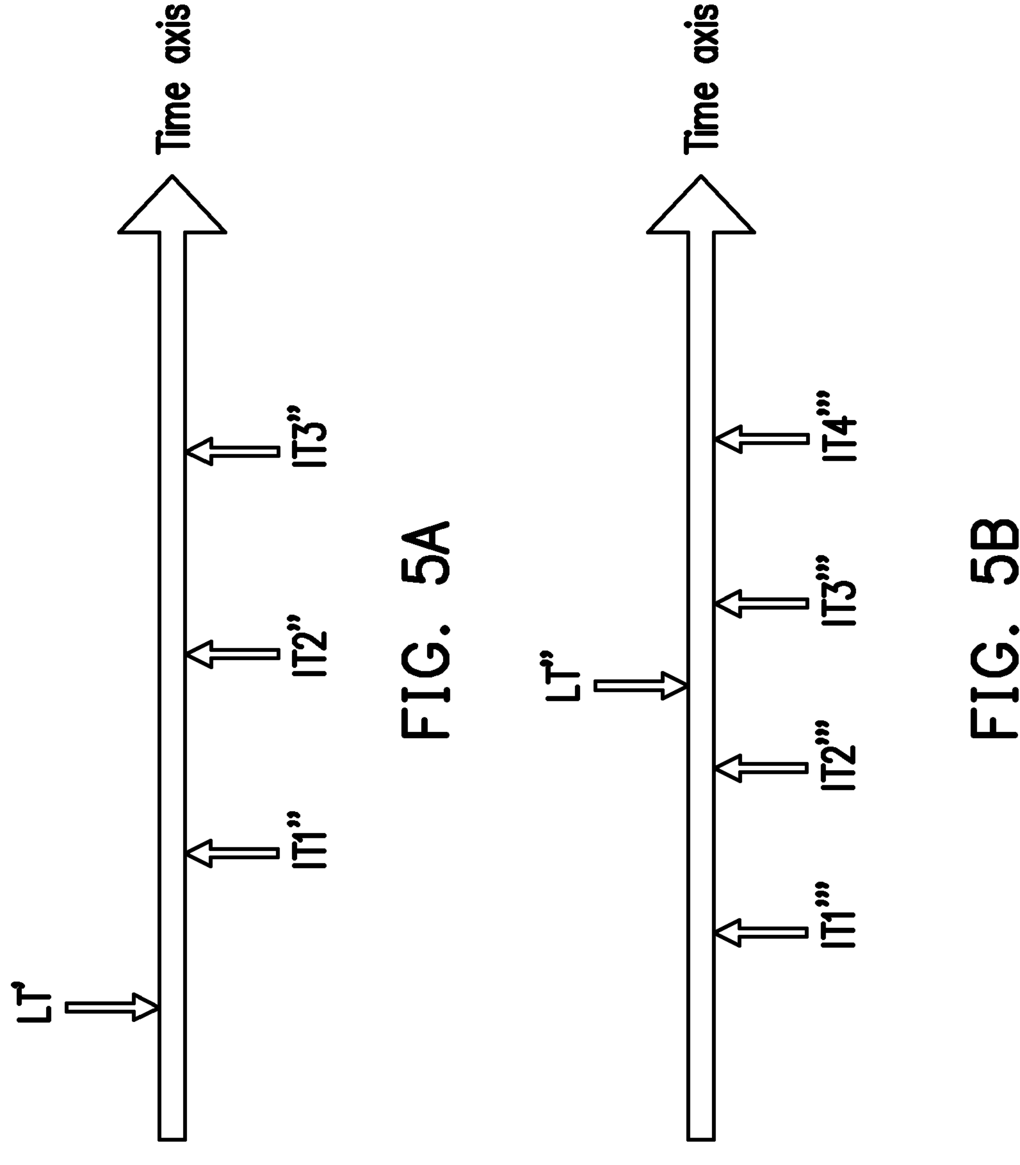
FIGS. 5A to 5B are schematic diagrams of the timeline of a processing and testing equipment according to an embodiment of the present invention.

Please refer to FIG. 5A. When the measurement unit 140 measures, the light source 141 (such as a pulse laser) is configured to illuminate according to each timing. The process laser light source 131 performs process laser processing. After the processing process LT', the measurement unit 140 performs a plurality of timing measurements (IT1"~IT3") on the same position to observe the changing states of the processing component 120 during the period from the time after the process laser processing.

Please refer to FIG. 5B. Before the process laser light source 131 performs process laser processing, the measurement unit 140 starts to measure the same position for a plurality of timings (IT1"~IT2'). Then, the process laser light source 131 performs process laser processing to observe the changing states of the timing (IT1"~IT2') before the process and the changing states after the process LT".

In an embodiment not shown, the processing process LT" overlaps with one of the timings when the measurement unit 140 performs measurement, and is configured to measure the state of the processing component 120 while the processing process LT" is being performed.

To sum up, in the processing and testing equipment and testing equipment of the embodiment of the present invention, the processing unit provides a process laser to perform the processing process on the processing component on the carrier stage. The light source in the measurement unit illuminates the processing component to generate a light signal from the processing component, and the vibration mirror reflects the plurality of light signals from the processing component to different directions according to a plurality of different timings. The plurality of light signals are imaged in the image sensing element through the focusing model. A plurality of time intervals when the light source are activated are synchronized with each of the plurality of timings when the vibration mirror reflects each of the plurality of light signals to each of the plurality of corresponding image sensing areas, and a recorded picture of the image sensing element in a single exposure comprises a plurality of images received according to the plurality of different timings, and the plurality of images are respectively imaged in the plurality of different image sensing areas. Through post-production, the plurality of images corresponding to each of the plurality of image sensing area in the recorded picture in the single exposure are captured and arranged according to the plurality of timings, and the video of the processing component (sample) during the processing process can be continuously played. In this way, high dynamic resolution images (such as ultra-high dynamic resolution images) can be achieved, and temporal tomography analysis can be performed simultaneously during the processing process or product fabrication process.

What is claimed is:

1. A processing and testing equipment, comprising:

a carrier stage, configured to carry processing component;

a processing unit, providing a process laser, wherein the processing unit is configured to perform a processing process on the processing component on the carrier stage; and a measuring unit comprising:

a light source, illuminating a position of the processing component on the carrier stage, wherein the light source makes the processing component generate a plurality of light signals;

a vibration mirror, reflecting the plurality of light signals from the processing component to different directions according to a plurality of timings;

an image sensing element, having a plurality of image sensing areas, wherein the image sensing element is respectively configured to receive the plurality of light signals reflected by the vibration mirror according to the plurality of timings; and a focusing module, disposed in a light path from the carrier stage to the image sensing element, wherein the focusing module is configured to make the plurality of light signals reflected by the vibration mirror from the different directions be respectively imaged in each of the plurality of the image sensing areas of the image sensing element according to the plurality of timings, and the field of view of the focusing module covers the processing component, wherein a plurality of time intervals when the light source are activated are synchronized with each of the plurality of timings when the vibration mirror reflects each of the plurality of light signals to each of the plurality of corresponding image sensing areas, a recorded picture of the image sensing element in a single exposure comprises a plurality of images received according to the plurality of different timings, and the plurality of images are respectively imaged in the plurality of different image sensing areas, wherein the light source includes a plurality of light sources with different wavelengths, and semi-reflective mirrors are respectively configured to guide light emitted by the plurality of light sources with the different wavelengths to the processing component.

2. The processing and testing equipment according to claim 1, wherein the processing process is followed by the plurality of timings.

3. The processing and testing equipment according to claim 1, wherein a buffer zone located between the plurality of image sensing areas is configured to spatially separate the plurality of image sensing areas.

4. The processing and testing equipment according to claim 3, wherein the image corresponding to the field of view is imaged into one of the plurality of image sensing areas and the buffer zone surrounding the plurality of image sensing areas.

5. The processing and testing equipment according to claim 3, wherein the image corresponding to the field of view is completely imaged into one of the plurality of image sensing areas.

6. The processing and testing equipment according to claim 1, wherein the light emitted by the plurality of light sources with the different wavelengths is alternately guided to the processing component according to the plurality of continuous timings.

7. The processing and testing equipment according to claim 6, wherein the plurality of continuous timings respectively corresponding to the light emitted by the light sources with the different wavelengths constitute a timing group, and minimum time difference between two of the adjacent timing groups is greater than minimum time difference between the plurality of timings in a same timing group.

* * * * *